(12) United States Patent
Karamanolis et al.

(10) Patent No.: US 7,856,419 B2
(45) Date of Patent: Dec. 21, 2010

(54) METHOD AND SYSTEM FOR STORAGE REPLICATION

(75) Inventors: Christos Karamanolis, Los Gatos, CA (US); Matthew Benjamin Amdur, Cambridge, MA (US); Patrick William Penzias Dirks, Monte Sereno, CA (US)

(73) Assignee: VMware, Inc, Palo Alto, CA (US)

( * ) Notice: Subject to any disclaimer, the term of this patent is extended or adjusted under 35 U.S.C. 154(b) by 427 days.

(21) Appl. No.: 12/107,205

(22) Filed: Apr. 22, 2008

(65) Prior Publication Data

US 2009/0254582 A1    Oct. 8, 2009

Related U.S. Application Data

(60) Provisional application No. 61/042,693, filed on Apr. 4, 2008.

(51) Int. Cl.
*G06F 17/30* (2006.01)
(52) U.S. Cl. ..................................................... 707/626
(58) Field of Classification Search .................. 707/626
See application file for complete search history.

(56) References Cited

U.S. PATENT DOCUMENTS

| | | | |
|---|---|---|---|
| 7,072,915 B2 | 7/2006 | Kaczmarski et al. | |
| 2003/0046260 A1* | 3/2003 | Satyanarayanan et al. | 707/1 |
| 2004/0186858 A1* | 9/2004 | McGovern et al. | 707/200 |
| 2005/0027748 A1 | 2/2005 | Kisley | |
| 2005/0066059 A1* | 3/2005 | Zybura et al. | 709/248 |
| 2005/0144202 A1 | 6/2005 | Chen | |
| 2005/0246312 A1* | 11/2005 | Jordan et al. | 707/1 |

OTHER PUBLICATIONS

International Search Report and Written Opinion as mailed in PCT Application No. PCT/US2009/038497 on Nov. 16, 2009.

* cited by examiner

*Primary Examiner*—James Trujillo
*Assistant Examiner*—William Spieler

(57) ABSTRACT

Consistent replicas of a data object are created using a replication protocol that includes an opportunistic replication phase followed by a consistent replication phase. During the opportunistic replication phase, dirty regions are selected from the data object included in a primary computer and copied to a data object replica included in a secondary computer according to a selection heuristic. During the consistent replication phase, an immutable image of the data object is created by the primary computer and the remaining dirty regions are copied from the immutable image of the data object to the data object replica to create a consistent replica of the data object.

27 Claims, 6 Drawing Sheets

METHOD AND SYSTEM FOR STORAGE REPLICATION

CROSS-REFERENCE TO RELATED APPLICATION

This application claims the benefit of U.S. Provisional Patent Application Ser. No. 61/042,693, filed Apr. 4, 2008.

BACKGROUND OF THE INVENTION

Storage replication is a data protection strategy in which data objects (e.g., files, physical volumes, logical volumes, file systems, etc.) are replicated to provide some measure of redundancy. Storage replication may be used for many purposes, such as ensuring data availability upon storage failures, site disasters, or planned maintenance. Storage replication also may be used for purposes other than ensuring data availability. For example, workloads may be directed to a replica of a data object rather than to the primary data object.

Often, storage replication methods are designed to support a constraint known as a recovery point objective (RPO) that typically specifies an upper limit on the potential data loss upon a failure or disaster. An RPO can be specified in terms of time, write operations, amount of data changed, and the like. For example, if an RPO for a certain set of data objects is specified as twenty-four hours, then a storage replication method designed to support this RPO would need to replicate such a set of data objects at least every twenty-four hours. This particular method replicates data object contents in such a way that the RPO for each data object is met.

In a typical storage replication scenario, there is one primary copy of the data object and one or more replicas of the data object. According to one storage replication method, an immutable image of the primary data object is created and then the "dirty regions" of the immutable object image are copied to the corresponding replica. "Dirty regions" refer to portions of the primary data object that have been modified since the last point at which the said portions of the data object have been copied to the replica. The creation of an immutable image of the primary data object is needed so that the copying of dirty regions results in a consistent data object replica. This cycle of creating an immutable object image and copying the dirty regions to the replica of the data object is repeated with a frequency that satisfies the RPO for the corresponding data set.

Creating an immutable object image, however, requires overhead in terms of computations, I/O performance, storage space, or all of the above. Consequently, storage replication methods are often designed to create an immutable object image and copy dirty regions infrequently, thus resulting in conservative (long) RPOs. Also, the immutable object image is usually created just in time to meet the RPO for the data object. Thus, the dirty regions are transferred during a narrow time window, and this makes it difficult to make efficient use of resources, such as CPU, disk bandwidth, network bandwidth, etc.

SUMMARY OF THE INVENTION

One or more embodiments of the invention provide a storage replication protocol that reduces the overhead that is required during storage replication. As a result, storage replication can be carried out more frequently and thus meet more aggressive (shorter) RPOs.

In one embodiment, a method for creating a consistent replica of a data object is provided. The method includes determining one or more regions of the data object as dirty regions, and copying one or more dirty regions onto a replica of the data object. The method further includes creating an immutable image of the data object, and copying dirty regions that have not been copied onto the replica of the data object, from the immutable image of the data object onto the replica of the data object, to create a consistent replica of the data object.

In another embodiment, a method for creating a consistent replica of a data object according to a replication protocol that includes a first protocol phase and a second protocol phase is provided. During the first protocol phase, regions in the data object that have been modified are tracked, and the modified regions are selectively copied onto a replica of the data object. During the second protocol phase, an immutable image of the data object is created, and the regions from the immutable image of the data object that correspond to the regions of the data object that have been modified during the first protocol phase but were not copied to the replica of the data object, are copied onto the replica of the data object. The two phases of the replication protocol are executed repeatedly in the said order.

A storage replication system according to an embodiment of the invention includes a first computer associated with a primary data object and a second computer associated with a secondary data object. The first computer and the second computer may be the same or different computers and, if different, they may reside in the same or different locations. The first computer is programmed to keep track of regions in the primary data object that have been modified, designate the modified regions as being dirty, selectively transmit the dirty regions to the second computer, create an immutable image of the primary data object, and transmit regions in the immutable image of the primary data object corresponding to the dirty regions that have not yet been transmitted to the second computer. The second computer is programmed to receive the dirty regions from the primary data object and store them persistently in the secondary data object, and to create immutable images of the secondary data object when the secondary data object is in a consistent state.

DETAILED DESCRIPTION

According to one or more embodiments of the invention, consistent replicas of a data object are periodically created in compliance with the data object's RPO. The method of creating the consistent replicas starts from an initial replica of the data object, which may be a copy of the data object created in any technical feasible way. The method keeps track of regions of the data object that are modified by write operations and iterates through a number of replication rounds. At the conclusion of each replication round, a new consistent replica is created. Each replication round consists of two phases. In the first phase, the modified regions are selectively transferred from the data object to a replica of the data object. These transfers do not necessarily result in a consistent replica. In the second phase, an immutable instance of the data object is created and all dirty regions of the immutable instance of the data object are transferred to the replica of the data object. Persistent storage of the transferred dirty regions in the replica of the data object results in a consistent replica. An immutable image of the consistent replica is then created and the second phase is completed. Then, a new replication round is initiated.

As used herein, a "consistent" replica of a data object reflects a write operation W2 only if all write operations to the same object that are potential causal predecessors of W2 are reflected in the same replica. A write operation W1 is a potential causal predecessor of W2 if and only if W2 is issued after the completion of W1.

Figure 1:
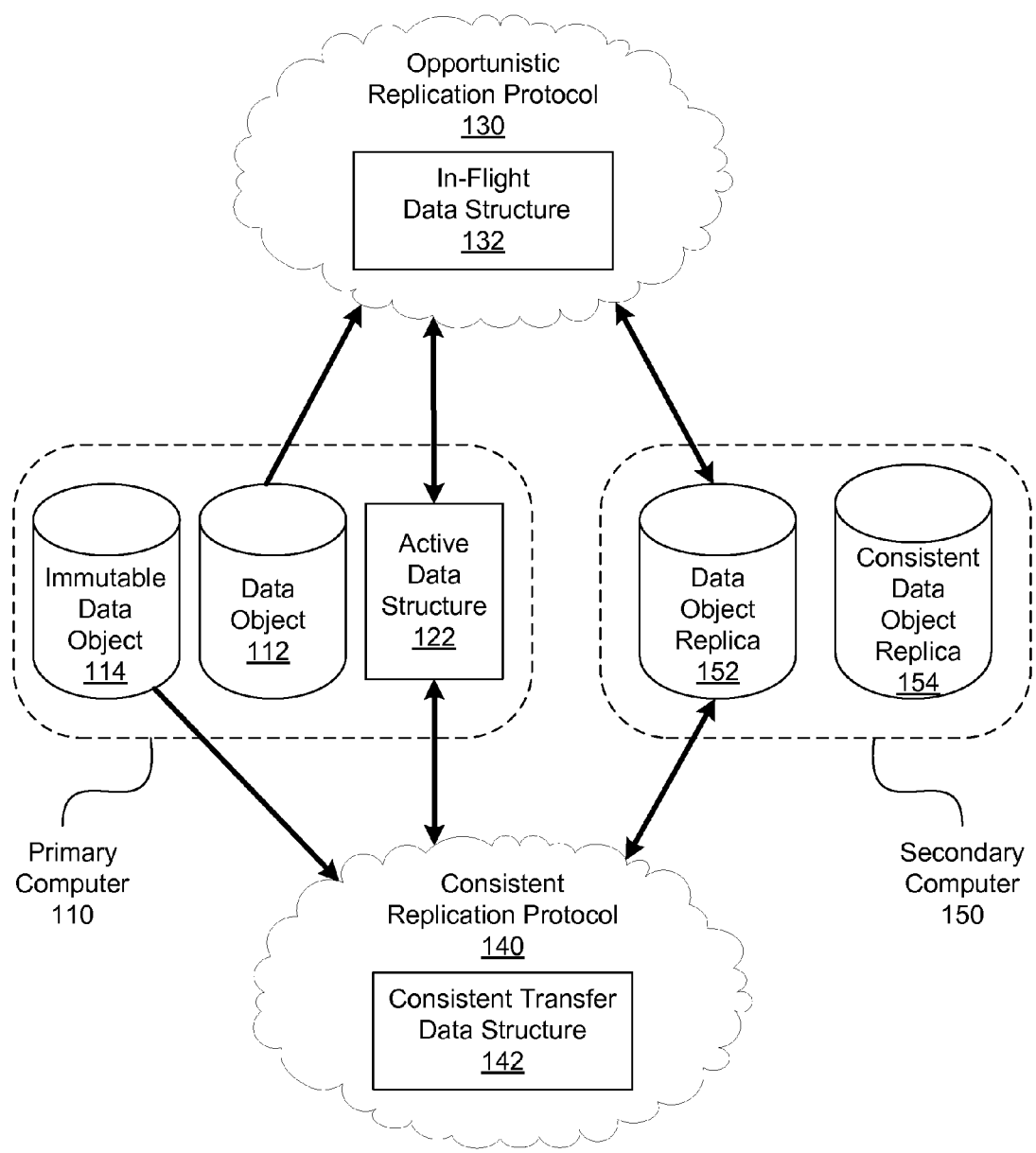
FIG. 1 schematically illustrates a protocol for storage replication according to one or more embodiments of the invention.

FIG. 1 schematically illustrates a protocol for storage replication according to one or more embodiments of the invention. The protocol illustrated in FIG. 1 is a protocol that includes an opportunistic replication protocol 130 and a consistent replication protocol 140, both of which will be described in further detail below. A data object 112 resides in a primary computer 110 and is replicated according to this protocol. The replica of data object 112 resides in a secondary computer 150. Primary computer 110 and secondary computer 150 may be parts of the same computer or different computers and may be located in the same or physically separate locations (e.g., data centers). In addition, the data structures and protocols disclosed herein may be implemented in any technically feasible fashion using software constructs, hardware constructs, or any combination thereof.

Data object 112 may be a file, a physical volume, a logical volume, a file system, etc., that is managed by primary computer 110. Data object 112 may comprise a single data object or a set of data objects. In either case, the singular form of data object 112 is used herein for simplicity. Also, data object 112 is comprised of one or more data regions. The granularity of a data region is a configurable parameter that may be determined by the designer based on factors such as the unit of I/O atomicity in the underlying storage system, the granularity at which the designer wishes to replicate data, the approach used to track newly written data, and the like.

Immutable data object 114 represents an immutable image of data object 112 at a certain point in time. In the embodiment illustrated herein, immutable data object 114 is created at the beginning of consistent replication protocol 140 from data object 112 and preserved during execution of consistent replication protocol 140 by ensuring that new write operations to data object 112 do not modify immutable object 114. Any technically feasible method may be employed to create and preserve immutable data object 114. As one example, a copy-on-write method may be used. Other methods include logging and making a copy of the entire data object 112. Thus, in some embodiments, data object 112 is a logical composition of immutable data object 114 and any write operations performed thereon.

Primary computer 110 tracks dirty regions of data object 112. A data region is "dirty" if it has been modified by a write operation. The tracking of dirty regions may be accomplished in any technically feasible fashion. Depending on the method used for tracking dirty regions of data objects, various data structures may be used. In the embodiments of the invention illustrated herein, active data structure 122 is employed. Active data structure 122 can be implemented as a single data structure, as part of a larger data structure, or as multiple data structures. Examples of implementation include, but are not limited to, bitmaps, logs, and checksum lists.

The replica of data object 112 residing in secondary computer 150 includes a data object replica 152 and a consistent data object replica 154. Both data object replica 152 and consistent data object replica 154 represent a replica of data object 112. Data object replica 152, however, may not be a consistent replica. Data object replica 152 is updated during opportunistic replication protocol 130 and consistent replication protocol 140. At the conclusion of consistent replication protocol 140, data object replica 152 is in a consistent state. An immutable image of data object 152 is then created and becomes the latest consistent data object replica 154. Any technically feasible method may be employed to do this. As one example, a copy-on-write method may be used. Other methods include logging and making a copy of the entire data object 112. Thus, in some embodiments, data object replica 152 is just a logical composition of consistent data object replica 154 and the changes that it has received from primary computer 110.

The method used for creating immutable data object 114 from data object 112 need not be the same method used for creating a new consistent data object replica 154 from data object replica 152. Also, in one embodiment, only the most recent consistent data replica is maintained by secondary computer 150. In another embodiment, a history of consistent data replicas is maintained by secondary computer 150.

To implement an efficient storage replication protocol that satisfies a particular RPO, a replication protocol that includes opportunistic replication protocol 130 and consistent replication protocol 140 is carried out on a periodic basis. Each replication round creates a new consistent data replica of data object 112. The very first consistent data replica of data object 112 may be created in any technically feasible fashion. In one embodiment, this is done by designating all regions in data object 112 as being dirty and, subsequently, carrying out the replication protocol.

Each replication round of the replication protocol includes an opportunistic replication phase during which opportunistic replication protocol 130 is carried out followed by a consistent replication phase during which consistent replication protocol 140 is carried out. During the opportunistic replication phase, primary computer 110 scans active data structure 122 for dirty regions to be applied to data object replica 152. Dirty regions are selectively read from data object 112 and written to data object replica 152. After terminating opportunistic replication protocol 130, primary computer 110 begins the consistent replication phase. During this phase, it creates an immutable data object 114, copies any dirty regions that are not reflected in data object replica 152 from immutable data object 114 (as will be further described below), and transfers them to secondary computer 150 for persistent storage in data object replica 152. After these writes are carried out, data object replica 152 is in a consistent state and secondary computer 150 creates an immutable image of data object replica 152, which becomes the new consistent data object replica 154. After the conclusion of the consistent replication phase, the immutable data object 114 can be removed, and a new replication round can be initiated by restarting the opportunistic replication phase.

An in-flight data structure 132 is used during the opportunistic replication phase to keep track of dirty regions of data object 112 that are "in-flight" between primary computer 110 and secondary computer 150. As used herein, an "in-flight" dirty region is a dirty region that is in the process of being transferred for storage in a replica of a data object. More specifically, when one or more dirty regions are selected from active data structure 122, in an "atomic" operation, the selected dirty regions are removed from active data structure 122 and added to in-flight data structure 132. Then, the selected dirty regions are read from data object 112 and transmitted to secondary computer 150 for storage in data object replica 152 As used herein, when steps of an "atomic" operation are being executed, no other part of the protocol modifies the involved data structures, e.g., because of a write operation completion. Upon receiving acknowledgement that one or more regions has been written to persistent storage in the data object replica 152, in-flight data structure 132 is updated to indicate that these dirty regions are no longer in-flight.

The selection of dirty regions from active data structure 122 and the decision as to when to transfer the selected dirty regions is carried out using any technically feasible selection heuristic. The selection heuristic may select one or more dirty regions, or none. Also, the selection heuristic can take into account a number of factors including but not limited to: (1) how to amortize the use of processor, memory and network resources over a period of time; and (2) avoiding too many unnecessary copies of regions when there is a high ratio of overwrites due to write locality in the workload. Further, the frequency with which active data structure 122 is reviewed for such selection may be determined by the system designer.

After a particular data region has been selected for transmission to secondary computer 150 for storage in data object replica 152, a new write to data object 112 may target the data region. In such a scenario, active data structure 122 is updated to reflect that the data region is again dirty. Depending on when the data region is read from data object 112, either the new version of the data region or the old version of the data region may be transferred. However, even if the old version of the data region is transferred, active data structure 122 still reflects that the data region is dirty. Therefore, the new version of the data region will be transferred subsequently during the same opportunistic replication phase or during the next consistent replication phase.

A consistent transfer data structure 142 is used during the consistent replication phase to keep track of dirty regions of data object 112 that have not been persistently stored in data object replica 152. When started, consistent replication protocol 140 performs the following three steps as an atomic operation: 1) updates consistent data structure 142 to reflect the dirty regions reflected in active data structure 122 and in-flight data structure 132; 2) removes any references to dirty regions from active data structure 122 and in-flight data structure 132; and 3) creates immutable data object 114. Subsequently, all of the dirty regions reflected in the consistent transfer data 142 structure are copied from the immutable data object 114 to data object replica 152. After these regions are copied, data object replica 152 is a consistent replica of data object 112.

It is to be noted that any data regions that were transmitted during the opportunistic replication phase but were not yet received by secondary computer 150 will ultimately be reflected in data object replica 152, because dirty regions identified in in-flight data structure 130 are reflected in consistent transfer data structure 142. Thus, these data regions will be re-transmitted during the consistent replication phase. In alternate embodiments, the initiation of consistent replication phase is delayed until all in-flight dirty regions have been transmitted and persistently stored in data object replica 152.

During the consistent replication phase, dirty regions may continue to be reflected in active data structure 122. However, these dirty regions correspond to writes to data object 112 subsequent to the creation of the relevant immutable data object 114. When a new replication round is initiated, active data structure 122 having these dirty regions will be reviewed for transfer to secondary computer 150, during the subsequent opportunistic protocol phase or consistent protocol phase.

Again, in-flight data structure 132 and consistent transfer data structure 142 may be implemented in any technically feasible fashion using software constructs, hardware constructs, or any combination thereof. For example, in-flight data structure 132 may be implemented using a log that identifies all of the in-flight dirty regions. After receiving acknowledgment of the successful persistent storage of a particular region, the region is removed from the log. Consistent transfer data structure 142 may also be implemented as a log. Because in-flight data structure 132 and consistent data structure 142 are not used at the same time, the same data structure may be used for in-flight data structure 132 and consistent transfer data structure 142.

Figure 2:
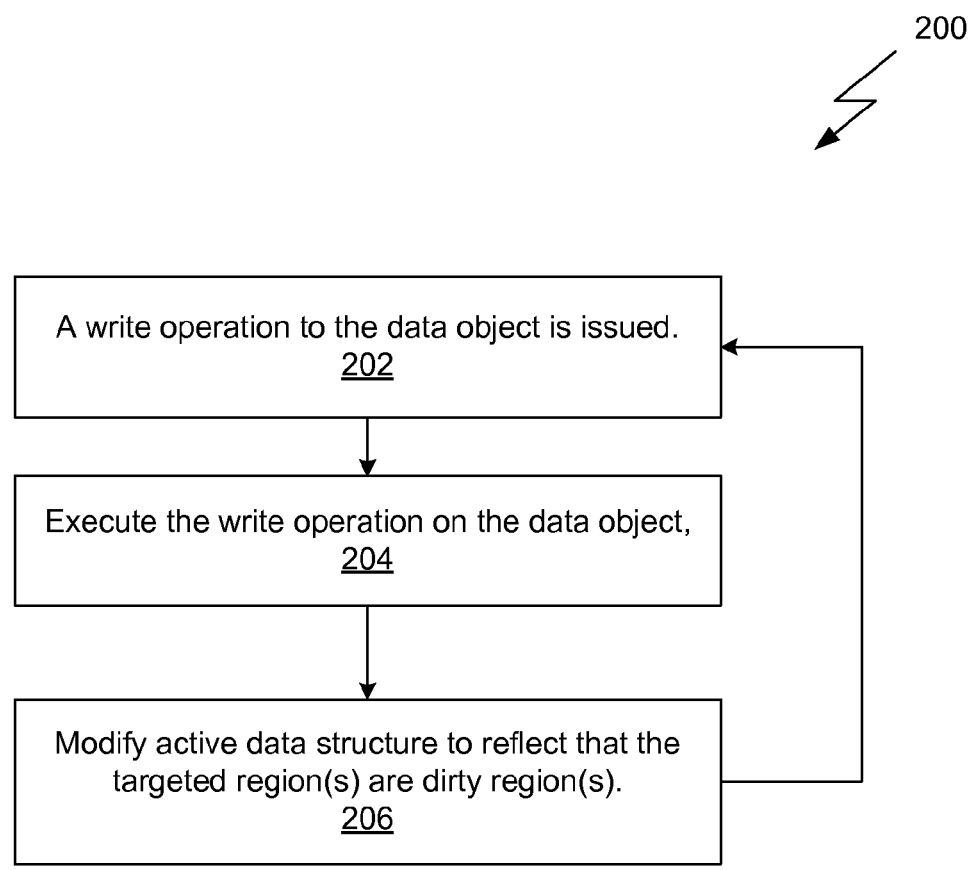
FIG. 2 is a flow diagram of a method for executing writes to a data object.

FIG. 2 is a flow diagram of a method for executing writes to data object 112 of FIG. 1. Method 200 is carried out by primary computer 110 and begins at step 202, where primary computer 110 issues a write operation to one or more data regions included in data object 112. At step 204, primary computer 110 executes the write operation on data object 112. At step 206, primary computer 110 modifies active data structure 122 to reflect that the data regions targeted by the write operation are dirty. Persons skilled in the art will recognize that this modification can be done upon issuing of the write operation with corresponding modifications to the presented protocols. Method 200 then returns to step 202, where primary computer 110 issues a new write operation. Method 200 continues in this fashion, looping through steps 202-206.

Figure 3:
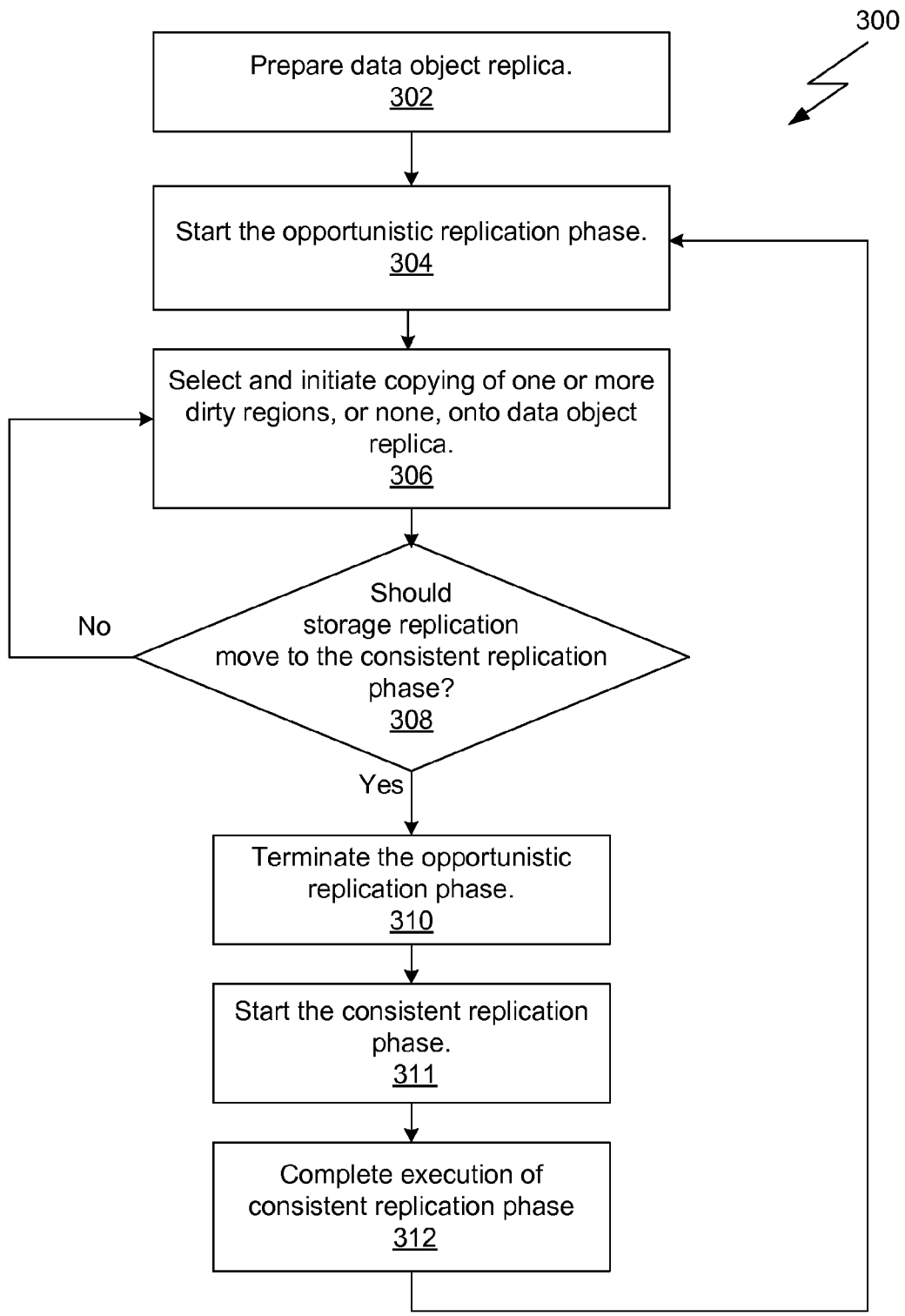
FIG. 3 is a flow diagram of a method for executing replication rounds.

FIG. 3 is a flow diagram of a method for executing replication rounds. Method 300 is carried out by primary computer 110 and secondary computer 150 and begins at step 302, where an initial data object replica 152 is created. Persons skilled in the art will recognize that there are multiple methods that can be applied to create an initial data object replica. For example, it may be first created by designating all regions in data object 112 as being dirty and carrying out opportunistic replication protocol 130 and consistent replication protocol 140. Alternatively, the initial data object replica may be a copy of data object 112, created in any technically feasible way, so long as its contents and active data structure 122 in combination reflect the up-to-date contents of data object 112. Upon initiation of method 300, there may be no consistent data object replica 154.

At step 304, the opportunistic replication phase is started. At step 306, according to a selection frequency and selection heuristic, one or more dirty regions specified in active data structure 122 or none are copied from data object 112 onto data object replica 152. As detailed above in conjunction with FIG. 1, the selection frequency is specified by the designer. A series of method steps for selecting and transmitting one particular region of data object 112 for copying onto data object replica 152 is described in greater detail below with reference to FIG. 4. At step 308, if the storage replication is to remain in the opportunistic replication phase, then method 300 returns to step 306. Method 300 continues in this fashion, looping through steps 306-308 until the storage replication enters the consistent replication phase.

If, at step 308, the storage replication is to transition to the consistent replication phase, then method 300 proceeds to step 310. At step 310, the opportunistic replication phase is terminated. In step 311, the consistent replication phase is started. A series of method steps for executing the consistent replication phase of a replication round is described in greater detail below in conjunction with FIG. 5. After step 310, method 300 loops back to step 306 to begin a new replication round with the reactivation of the opportunistic replication protocol. Method 300 continues in this fashion, looping through steps 306-312, executing sequential replication rounds until storage replication is terminated.

Figure 4:
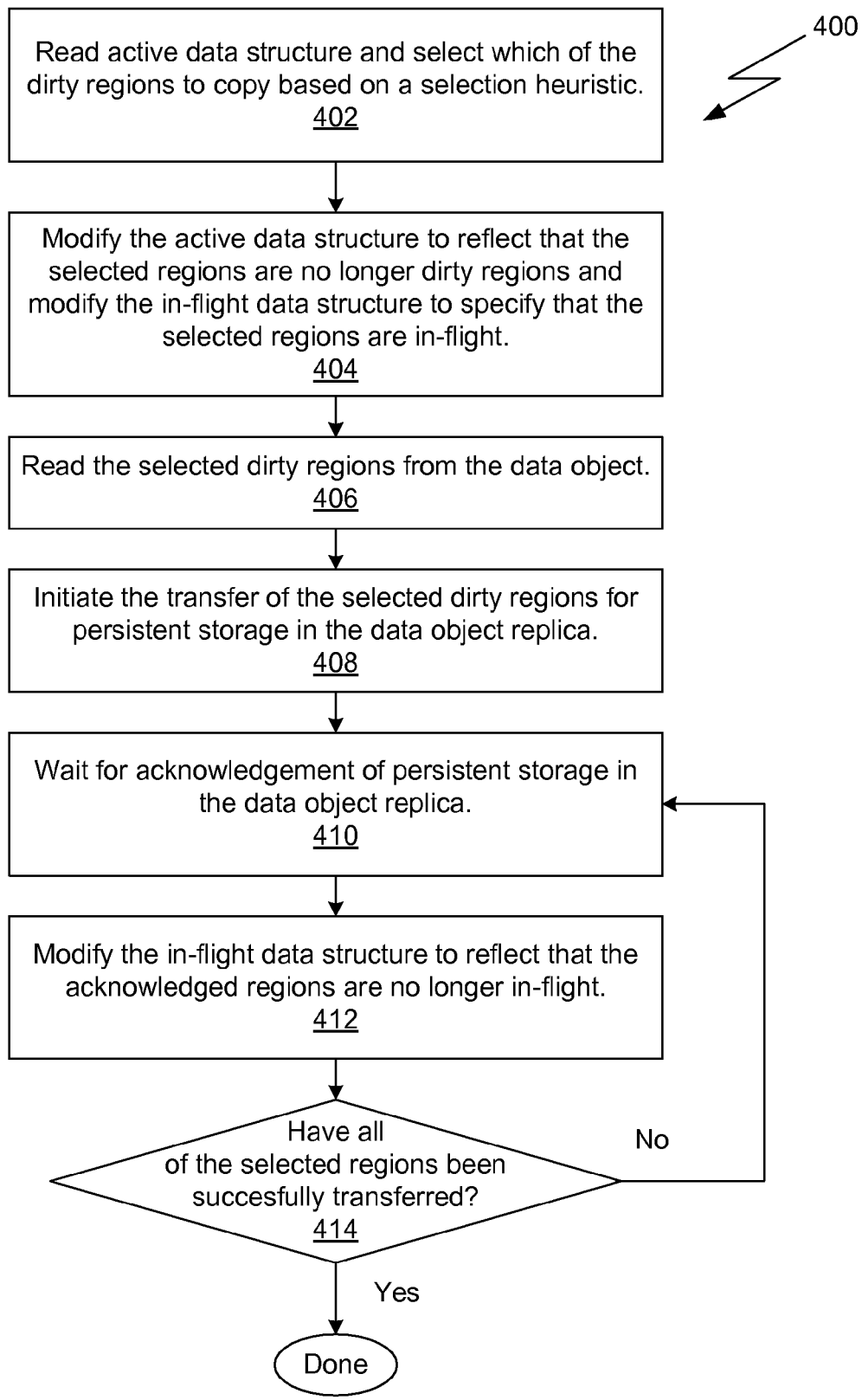
FIG. 4 is a flow diagram of a method for selecting and copying regions during the opportunistic replication phase.

FIG. 4 is a flow diagram of a method 400 for selecting and transmitting one particular region of data object 112 for copying onto data object replica 152 during the opportunistic replication phase. Method 400 represents a sequence of steps that are carried out for one particular region of data object 112. During the opportunistic replication phase, method 400 may be carried out concurrently for a number of different regions of data object 112 up to a predefined maximum degree of concurrency.

Method 400 is carried out by primary computer 110 and begins at step 402, where according to a selection frequency and selection heuristic, one or more dirty regions specified in active data structure 122 or none are selected from data object 112 for transmission to secondary computer 150. Step 404 includes a set of actions or operations that are performed as one atomic operation. At step 404, active data structure 122 is updated to reflect that the selected dirty regions are no longer dirty regions, and in-flight data structure 132 is modified to specify that the selected dirty regions as being in-flight. At step 406, the selected dirty regions are read from data object 112. At step 408, the transmission of the selected dirty regions to secondary computer 150 for persistent storage in data object replica 152 is initiated.

At step 410, primary computer 110 waits for acknowledgement from secondary computer 150 that one or more of the selected dirty regions have been persistently stored in data object replica 152. At step 412, in-flight data structure 132 is modified to reflect that acknowledged regions are no longer in-flight. At step 414, if acknowledgements for all of the selected dirty regions have not been received, then method 400 returns to step 410. Method 400 ends with respect to the selected dirty regions when acknowledgements for all of the selected dirty regions have been received.

It is to be noted that while opportunistic data protocol 130 is being carried out, consistent replication protocol 140 may be initiated. This will cause opportunistic replication protocol 130 and, therefore, method 400 being carried out for all regions to terminate.

Figure 5A:
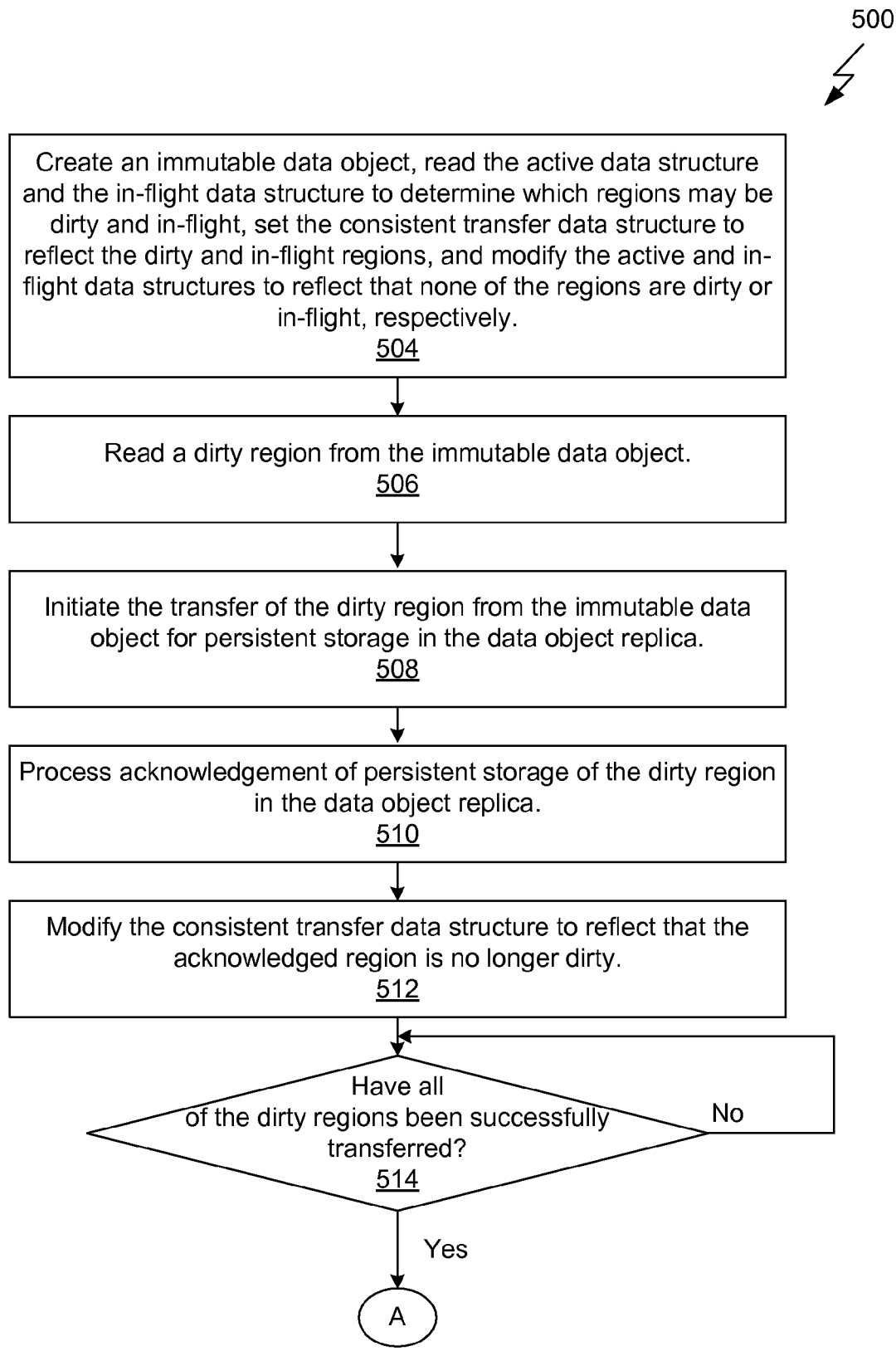
FIGS. 5A and 5B are a flow diagram of a method for executing the consistent replication phase.
Figure 5B:
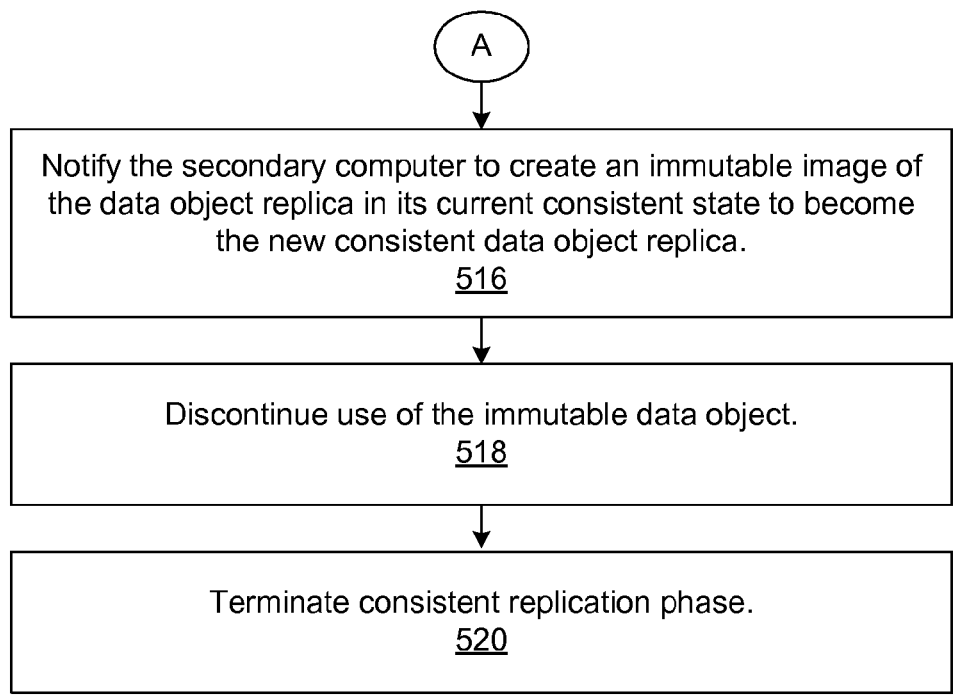

FIGS. 5A and 5B illustrate a flow diagram of a method 500 for executing the consistent replication phase. Method 500 is carried out by primary computer 110 after step 311 of FIG. 3. Step 504 includes a set of actions that are performed as one atomic operation. At step 504, primary computer 110 creates an immutable data object 114, reads active data structure 122 and in-flight data structure 132 to determine which data regions are dirty and in-flight, sets consistent transfer data structure 142 to reflect the dirty and in-flight regions, and modifies active data structure 122 and in-flight data structure 132 to reflect that none of the regions are dirty or in-flight. As detailed above in conjunction with FIG. 1, consistent transfer data structure 142 includes references to all dirty regions identified in active data structure 122 and in-flight data structure 132.

Steps 506-512 represent a sequence of steps that are carried out for one particular dirty region identified in consistent transfer data structure 142. These steps may be carried out concurrently for a number of different dirty regions up to a predefined maximum degree of concurrency, and repeated as necessary to process all of the dirty regions identified in consistent transfer data structure 142. At step 506, primary computer 110 reads a dirty region from the immutable data object 114 for transmission to secondary computer 150. At step 508, the dirty region read from the immutable data object 114 is transmitted to secondary computer 150 for persistent storage in data object replica 152. At step 510, primary computer 110 processes the acknowledgement from secondary computer 150 that the dirty region has been persistently stored in data object replica 152. At step 512, consistent transfer data structure 142 is modified to reflect that the acknowledged region is no longer dirty.

At step 514, primary computer 110 continually checks if acknowledgements for all of the dirty regions identified in consistent transfer data structure 142 have been received. If so, method 500 proceeds to step 516. At step 516, primary computer 110 notifies secondary computer 150 to create an immutable image of data object replica 152 to become the new consistent data object replica 154. In one embodiment, the previous consistent data object replica is discontinued. In alternative embodiments, a number of prior consistent data object replica instances may be retained. At step 518, the use of immutable data object 114 is discontinued. At step 520, the consistent replication phase terminates.

In one embodiment, after the consistent protocol phase is started, there may still exist in-flight regions, the transfer of which was initiated by the previous opportunistic protocol phase. Primary computer 110 and secondary computer 150 are programmed so that all in-flight regions that were transferred as part of the previous opportunistic protocol phase are persistently stored in data object replica 152 before any regions transferred by the current consistent replication phase are persistently stored in data object replica 152.

In alternate embodiments, the initiation of consistent replication phase is delayed in step 310 of method 300 until all in-flight dirty blocks have been transmitted and persistently stored in data object replica 152. In such embodiments, at step 504, in one atomic operation, primary computer 110 creates an immutable data object 114, reads active data structure 122 to determine which data regions are dirty, sets consistent transfer data structure 142 to reflect the dirty regions, and modifies active data structure 122 to reflect that none of the regions are dirty. It is noted that, in such embodiments, in-flight data structure 132 is not used during the consistent replication phase.

While the forgoing is directed to various embodiments of the invention, other and further embodiments of the invention may be devised without departing from the basic scope thereof. Also, embodiments of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media.

What is claimed is:

1. A method for creating a consistent replica of a data object, the method comprising:
    (a) determining one or more regions of the data object as dirty regions;
    (b) copying one or more dirty regions onto a replica of the data object;
    (c) creating an immutable image of the data object; and
    (d) copying dirty regions that have not been copied onto the replica of the data object, from the immutable image of the data object onto the replica of the data object, to create a consistent replica of the data object.

2. The method according to claim 1, further comprising:
selecting one or more dirty regions for step (b) of copying; and
designating the selected dirty regions as in-flight regions.

3. The method according to claim 2, further comprising:
receiving an acknowledgment that the in-flight regions have been copied onto the replica of the data object; and
removing an in-flight designation of the in-flight regions in response to receiving the acknowledgment.

4. The method according to claim 3, wherein the dirty regions that have not been copied onto the replica of the data object include the dirty regions that have not been selected for copying and the in-flight regions for which the acknowledgment has not been received.

5. The method according to claim 2, wherein a selection heuristic is employed in selecting one or more dirty regions for copying.

6. The method according to claim 1, wherein steps (a) and (b) are carried out during a first phase, and steps (c) and (d) are carried out during a second phase, and wherein the first phase and the second phase are repeated in that order as needed to meet predefined constraints.

7. The method according to claim 6, wherein during the second phase, new write operations to data regions of the data object are executed without modifying the immutable image of the data object.

8. The method according to claim 6, wherein completion of each second phase produces a consistent replica of the data object, and a history of consistent replicas of the data object is maintained.

9. The method according to claim 1, further comprising creating an immutable image of the last consistent replica of the data object and repeating steps (a) through (d) using the replica of the data object.

10. The method according to claim 1, wherein step (b) of copying is carried out in an iterative manner.

11. The method according to claim 10, further comprising:
selecting one or more dirty regions for step (b) of copying; and
designating the selected dirty regions as in-flight regions, wherein the steps of selecting and designating are carried out for each iteration of step (b) of copying.

12. A method for creating a consistent replica of a data object according to a replication protocol that includes a first protocol and a second protocol, the first protocol being implemented during a first protocol phase and the second protocol being implemented during a second protocol phase, the method comprising:
during the first protocol phase, maintaining a record that enables determining which regions in the data object have been written to and selectively copying the regions onto a replica of the data object; and
during the second protocol phase, creating an immutable image of the data object and copying these regions of the immutable image of the data object that correspond to the regions of the data object that were written to during the first protocol phase but were not copied to the replica of the data object, onto the replica of the data object.

13. The method according to claim 12, wherein at the conclusion of the second protocol phase, an immutable copy of the replica of the data object is made that cannot be modified during a subsequent first or second protocol phase.

14. The method according to claim 13, further comprising: during the first protocol phase, selecting regions to be copied to the replica of the data object and maintaining a record of regions that have been selected.

15. The method according to claim 14, wherein the record indicating writes is updated for regions in the data object that have been selected to be copied to the replica of the data object.

16. The method according to claim 15, further comprising: during the first protocol phase, receiving an acknowledgment that the selected regions have been copied to the replica of the data object.

17. The method according to claim 16, wherein the record of regions that have been selected is updated for regions for which the acknowledgment is received.

18. The method according to claim 14, wherein the regions are selected for copying according to a selection heuristic.

19. A storage replication system, comprising:
at least one primary computer maintaining a data object; and
at least one secondary computer connected to the primary computer and maintaining a replica of the data object,
wherein the primary computer is programmed to determine which regions of the data object are dirty, selectively transmit the dirty regions to the secondary computer, create an immutable image of the data object, and transmit regions in the immutable image of the data object corresponding to the dirty regions that have not been transmitted to the secondary computer, and
wherein the secondary computer is programmed to receive the dirty regions from the primary computer and store the dirty regions in the replica of the data object, and to create an immutable copy of the replica of the data object when instructed to do so by the primary computer.

20. The system according to claim 19, wherein the primary computer maintains a first data record in which dirty regions are identified and a second data record in which dirty regions that have been selected for transmission are identified.

21. The system according to claim 20, wherein the primary computer maintains a third data record in which dirty regions that have not been stored in the replica of the data object are identified.

22. The system according to claim 21, wherein the primary computer is programmed to generate the third data record based on the first data record and the second data record.

23. The system according to claim 22, wherein the primary computer is programmed to clear all entries in the second and third data records after receiving an acknowledgment from the secondary computer that an updated consistent replica of the data object has been created.

24. The system according to claim 19, wherein the primary computer and the secondary computer are located in separate locations.

25. The system according to claim 19, wherein the primary computer and the secondary computer are located in the same location.

26. The system according to claim 25, wherein the primary computer and the secondary computer are different computers.

27. The system according to claim 25, wherein the primary computer and the secondary computer are parts of the same computer.

* * * * *